(12) United States Patent
Lebreton

(10) Patent No.: US 7,018,198 B2
(45) Date of Patent: Mar. 28, 2006

(54) SELF-SEALING INJECTION DEVICE FOR THERMOPLASTIC MATERIAL

(75) Inventor: Thierry Lebreton, Saint Baldoph (FR)

(73) Assignee: Delachaux S.A., Gennevilliers (FR)

( * ) Notice: Subject to any disclaimer, the term of this patent is extended or adjusted under 35 U.S.C. 154(b) by 194 days.

(21) Appl. No.: 10/399,556

(22) PCT Filed: Oct. 19, 2001

(86) PCT No.: PCT/FR01/03241

§ 371 (c)(1),
(2), (4) Date: Jul. 28, 2003

(87) PCT Pub. No.: WO02/32646

PCT Pub. Date: Apr. 25, 2002

(65) Prior Publication Data

US 2004/0022893 A1    Feb. 5, 2004

(30) Foreign Application Priority Data

Oct. 20, 2000  (FR) .................................. 00 13451

(51) Int. Cl.
*B29C 45/23*   (2006.01)
(52) U.S. Cl. ..................................... 425/564; 425/566
(58) Field of Classification Search ............... 425/562, 425/563, 564, 565, 566
See application file for complete search history.

(56) References Cited

U.S. PATENT DOCUMENTS

| 4,433,969 A | * | 2/1984 | Gellert | ........................ 425/566 |
| 5,387,099 A | | 2/1995 | Gellert | |

FOREIGN PATENT DOCUMENTS

| DE | 2615282 | 11/1976 |
| EP | 0099088 | 1/1984 |
| FR | 1500630 | 11/1967 |
| FR | 2795993 | 1/2001 |

* cited by examiner

*Primary Examiner*—Tim Heitbrink
(74) *Attorney, Agent, or Firm*—Blakely Sokoloff Taylor & Zafman

(57) ABSTRACT

The present invention relates to an injector device for injecting thermoplastic material. The device comprises a dispenser (8) feeding a transit passage (12) of an injector nozzle (7) with thermoplastic material, said passage opening out into the mold cavity (2) and being capable of being closed by a sliding needle (21). The needle (21) presents an extender (24) which passes through the dispenser (8) into ambient air via guide means (38) in order to co-operate with controlled means (30) for moving the needle (21). Sealing is provided between the extender (24) and the guide means (38) by the thermoplastic material itself, which material leaks between them from the dispenser (8) and accumulates in an annular groove (43) in one of them. The invention is applicable to injection molding devices.

6 Claims, 1 Drawing Sheet

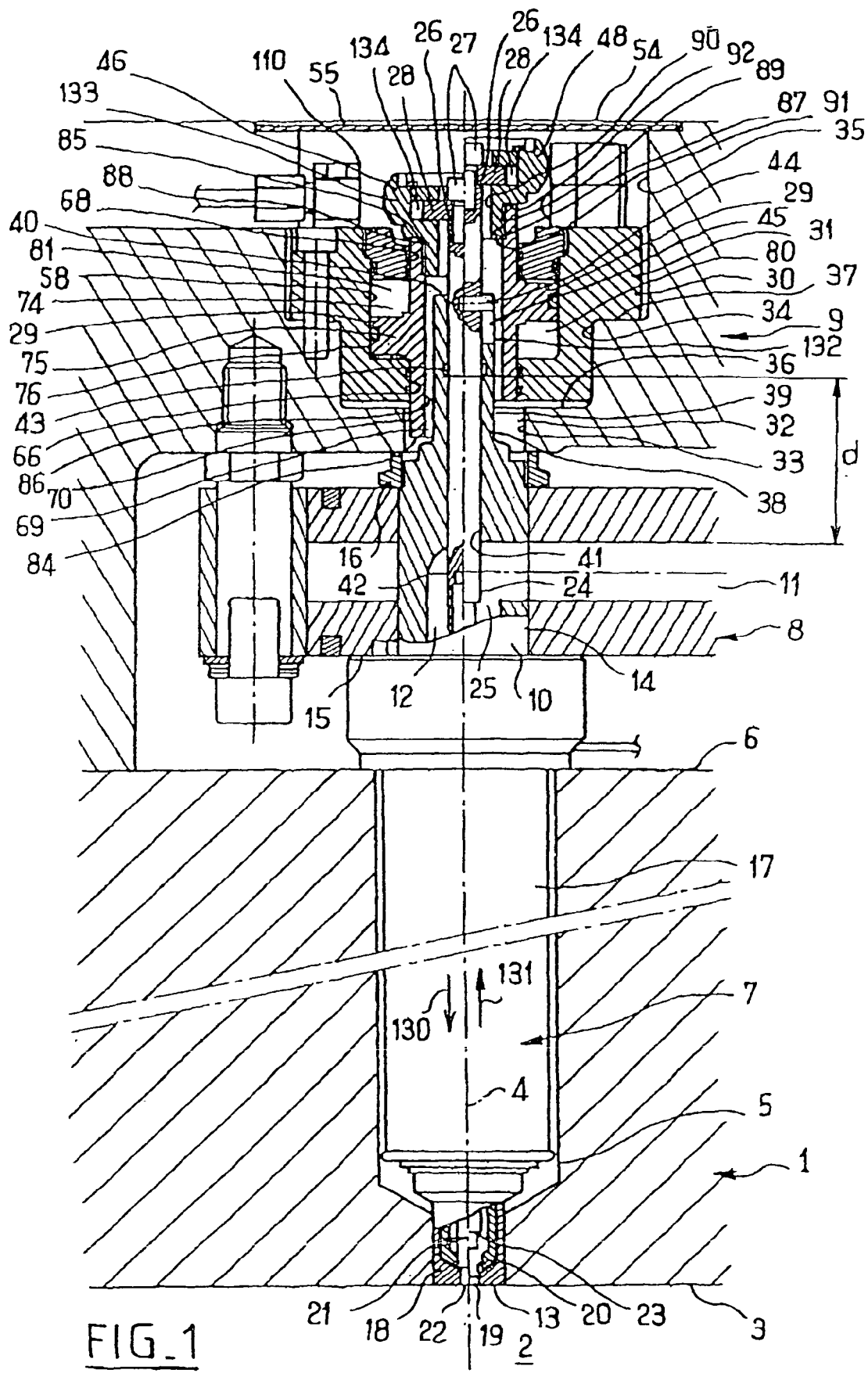
FIG_1

SELF-SEALING INJECTION DEVICE FOR THERMOPLASTIC MATERIAL

The present patent application is a non-provisional application of International Application No. PCT FR01/03241, filed Oct. 19, 2001.

The present invention relates to an injector device for injecting a thermoplastic material into a mold cavity, the material being in the fluid state when raised to a temperature that is not less than a determined limit temperature higher than the temperature of ambient air, said injector device including:

- a dispenser suitable for being maintained at an injection temperature higher than said determined limit temperature and defining a thermoplastic material dispensing passage having at least one outlet for delivering thermoplastic material in a determined longitudinal direction to one side of the dispenser;
- an injection nozzle which is suitable for being maintained at an injection temperature higher than said determined limit temperature and situated on said side of the dispenser, being secured thereto, and defining at least one longitudinal transit passage for the thermoplastic material, said passage being placed in fluid-flow connection with the outlet from the dispenser in the direction that is opposite to said direction and opening out in said direction in a front face suitable for being integrated in the mold cavity;
- at least one longitudinal closure needle mounted to slide longitudinally inside the transit passage between a position in which it closes it and a position in which it opens it, and presenting a longitudinal extender extending in the direction opposite to said direction, passing through the dispenser into ambient air on the side of the dispenser that is longitudinally opposite from said side thereof, via means for guiding longitudinal sliding and presented securely by the dispenser for this purpose, going longitudinally away from said outlet, the guide means and the extender of the needle presenting respective inner and outer cylindrical longitudinal peripheral faces in mutual guiding contact for relative longitudinal sliding, with one of said peripheral faces presenting an annular transverse groove for receiving a sealing gasket relative to the other one of said peripheral faces in the closed and open positions of the closure needle, and also in all longitudinal positions between them; and
- controlled means for causing the closure needle to slide longitudinally between said closed and open positions, said controlled means being disposed in ambient air on the side of the dispenser that is longitudinally opposite from said side thereof, and being functionally connected to the extender of the closure needle.

Such a device is well known in numerous embodiments, for example that described in French patent application No. 00/03892 filed on Mar. 28, 2000 by the Applicant, which describes various embodiments suitable for providing determined positioning of the front face of the injection nozzle, in particular in association with various ways of assembling it securely with the dispenser and various ways of assembling the various components of the injection nozzle relative to one another.

Nevertheless, until now, achieving sealing between the extender of the closure needle and the means for guiding said extender in sliding relative to the dispenser have remained problematic, particularly because of the difficulty in finding sealing gaskets that are capable of remaining effective over time, given their simultaneous exposure to temperatures close to the injection temperature, given their progressive clogging with thermoplastic material in the fluid state, and given the need to use said gaskets to compensate for differences in transverse thermal expansion between the extender of the closure needle and the guide means.

The object of the present invention is to provide a seal which is satisfactory in all those respects, and for this purpose the present invention proposes an injector device of the type specified in the preamble, characterized in that said groove is offset longitudinally relative to the dispensing passage in the direction opposite to said direction by a distance (d) that is determined in such a manner that under the effect of ambient air thermal conduction causes it to be placed at a temperature which is lower than the injection temperature but higher than said determined limit temperature when the dispenser and the injection nozzle are maintained at the injection temperature, and the thermoplastic material leaking in the fluid state between said inner and outer peripheral faces reaches said groove, fills it, and presents viscosity therein such as to remain stopped therein and itself constitute the sealing gasket.

A person skilled in the art will readily understand that using the thermoplastic material itself as the sealing gasket between the outer peripheral face of the extender of the closure needle and the inner peripheral face of the guide means for guiding said extender in longitudinal sliding relative to the dispenser makes it possible to obtain sealing that is effective and long-lasting, being intrinsically insensitive to the temperature rise to which the guide means and the extender of the closure needle are subjected during an injection operation or to any risk of being damaged by the thermoplastic material in the fluid state since that is what provides the sealing. The groove in one of the peripheral faces between which sealing is thus established then acts relative to the thermoplastic material both as a supply enabling sealing to be maintained even in the event of a thermal expansion difference between said faces, thereby accommodating said differences, and as means stopping any tendency to migrate beyond said faces.

More generally, as in the prior art, said inner and outer peripheral faces and said groove are circularly symmetrical about a common longitudinal axis and/or said groove is arranged in the inner peripheral face of the guide means, although other transverse configurations of said peripheral faces, e.g. polygonal or plano-convex, can be suitable, particularly when a plurality of closure needles are juxtaposed in multi-material injector devices, and matching shapes for the groove can also be selected, without any of that going beyond the ambit of the present invention.

To enable the required temperature to be obtained in the groove while occupying as little space in the longitudinal direction as possible, i.e. in order to facilitate ambient air cooling of the inner peripheral face of the guide means and of the outer peripheral face of the extender of the closure needle, it is preferable to provide for the guide means to comprise a longitudinal sleeve which is placed on the side of the dispenser that is longitudinally opposite from said side thereof, and connected to the dispenser, so as to project from the dispenser in the direction opposite to said direction, defining part of said inner peripheral face and placed in contact with ambient air, in particular transversely opposite said inner peripheral face. It is then advantageous for said groove to be arranged in the portion of said inner peripheral face which is defined by the sleeve.

For the same purpose, it is also preferable to provide for the controlled means to cause the closure needle to slide longitudinally between its closed and open positions to comprise a longitudinal annular actuator placed around the sleeve, leaving continuous annular clearance relative thereto, and comprising both a cylinder secured to the dispenser and a piston constrained longitudinally to move with the extender of the closure needle. The use of an annular actuator, which is known per se, provides the advantage that is likewise known of reducing longitudinal size; however it also provides an advantage that is specific to a device in accordance with the invention whereby preserving continuous annular clearance between its piston and the guide sleeve makes it possible to dispose a cushion of ambient air around the sleeve, thereby making it easier to cool the sleeve in the vicinity of the groove that receives the thermoplastic material.

Other characteristics and advantages of the present invention appear from the following description relating to a non-limiting embodiment, and from the accompanying drawing which forms an integral portion of the description.

Sole FIG. 1 shows a portion of a device of the invention for injecting thermoplastic material in the fluid state into a mold cavity, part of the figure being in section on a plane that includes a longitudinal axis of an injection nozzle forming part of the device.

FIG. 1 shows a mold 1 defining a mold cavity 2 by means of a face 3. An injection well 5 is provided in the mold 1 on a longitudinal axis 4 occupying a predetermined position relative to the mold 1. The well 5 opens out both into the face 3 in a longitudinal injection direction 130, and into a face 6 of the mold 1, opposite from the face 3 along the axis 4, in a longitudinal direction 131 opposite to the injection direction 130.

The inside of the well 5 receives a coaxial injection nozzle 7 that is carried securely and releasably by a dispenser 8 of material to be injected, which material is raised to and maintained at an injection temperature higher than a determined limit temperature referred to as the "visco-elasticity temperature", itself higher than the temperature of ambient air, and being the temperature above which the thermoplastic material is in the fluid state, such that said material is raised to and maintained in a plastic state prior to being introduced into the dispenser 8 by means that are not shown, and until it reaches the cavity 2 via the injection nozzle 7.

The dispenser 8 is mounted on a support plate 9 which essentially overlies the dispenser 8 beside its side that is longitudinally remote from the mold 1, and that is fixed to the face 6 of the mold by means that are not shown, under conditions such that the dispenser 8 can expand relative to the support plate 9 and to the mold 1 while its temperature is rising at the beginning of an injection operation under conditions that are suitable for ensuring that the nozzle 7 and the injection well 5 remain coaxial while the dispenser 8, the mold 1, and the support plate 9 are stabilized at the temperature they present during the injection process.

Below, it is assumed that these conditions are satisfied, i.e. that the nozzle 7 is coaxial in the well 5 so that the well axis 4 can consequently be considered as being the same as the axis of the nozzle 7.

Methods of mounting the dispenser 8 to the support plate 9 on the face 6 of the mold to achieve this purpose are known to the person skilled in the art and lie outside the scope of the present invention, so they are not described in further detail.

The dispenser 8 carries the nozzle 7 via a nozzle-mounting support 10, which support defines a passage 25 angled at 90° to provide fluid connection between a transverse passage 11 for dispensing material in the plastic state as provided in the dispenser 8 which has an outlet defined by the angled passage 25 to lie on the axis 4 facing in the injection direction 130 on the side of the dispenser 8 that faces towards the mold 1, and a longitudinal passage 12 for material in the plastic state extending in the injection direction 130 from the above-defined outlet to the inside of the cavity 2. This transit passage 12 is provided in the nozzle 7 along the axis 4 and opens out on said axis into the side of the cavity 2 via a front face 13 of the nozzle 7 that faces in the injection direction 130.

The nozzle-mounting support 10 is engaged along the axis 4 in the dispenser 8 which is pierced right through for this purpose along the axis 4 by a hole 14 that crosses through the passage 11, such that a portion of the hole 14 is to be found on either side of the passage 11.

The nozzle-mounting support 10 is engaged snugly in the hole 14 and is retained securely but removably on the dispenser 8 by the dispenser being clamped longitudinally between an annular transverse flange 15 presented by the support 10 on the same side of the dispenser 8 as the mold 1, the cavity 2, and the nozzle 7, and a transverse ring 16 screwed coaxially onto a thread (not referenced) presented by the support 10 on the other side of the dispenser 8.

Such a configuration is described in the French patent application filed on Mar. 28, 2000 under No. 00/03892 by the Applicant, and as a result does not require any further description.

In a manner which is also described in the above-cited French patent application and which is therefore described herein only as so far as it assists in understanding the present invention, the nozzle 7 is essentially constituted by a cohesive but removable assembly of a plurality of components, and in particular a nozzle cylinder 17 which can be made integrally with the support 10 or which can be cohesively but releasably secured thereto, and a nozzle endpiece 18 which follows the nozzle cylinder 17 in the injection direction 130 and which connects the nozzle cylinder 17 to the cavity 2, and in particular defines the front face 13.

The general shape of the nozzle cylinder 17 is that of a tube about the axis 4 defining the passage 12 about said axis over the major portion of the longitudinal dimension of the nozzle 7. Relative to the nozzle cylinder 17, the endpiece 18 constitutes a portion tapering in the injection direction 130 both on the outside for connection to the cavity 2 via a transversely narrowed zone of the injection well 5, immediately adjacent to the face 3 with which the front face 13 becomes completely flush, and on the inside so as to define a transversely narrowed outlet 19 in the face 13 leading from the passage 12 into the cavity 2. Slightly set back in the direction 131 from the outlet 19 and from the face 13, the endpiece 18 defines an annular transverse shoulder 20 around the passage 12 and facing in the direction 131, which shoulder may be frustoconical in shape, for example, being circularly symmetrical about the axis 4 and tapering towards the outlet 19 in the injection direction 130 so as to form a sealing seat for a longitudinal closure needle 21 which is received coaxially inside the passage 12, being guided to slide longitudinally relative to the cylinder 17 and to the endpiece 18 of the nozzle 7 so as to be capable of controlled movement relative thereto longitudinally between a position in which it closes the passage 12 at the endpiece 18, as shown in the left-hand half of FIG. 1, and a position in which it opens the passage 12, specifically at the endpiece 18, as shown in the right-hand half of FIG. 1.

The shape of the closure needle 21 is itself known, and matches the shape of the endpiece 18 so as to define the states in which the passage 12 is opened and closed by said endpiece.

In the example shown, the needle 21 has a front face 22 facing in the injection direction 130 and which, in the closed position, comes flush with the front face 13 of the endpiece 18, itself lying flush with the face 3 of the cavity 2 when the mold 1, the nozzle 7, the dispenser 8, and the support plate 9 are stabilized at the temperature they are to have during the injection process, whereas when in the open position this front face 22 is retracted in the direction 131 away from the shoulder 20. The shapes of the front faces 22 and 13 and the direction in which they face relative to the axis 4 are associated with the shape of the face 3 of the cavity 2. In the example shown, they are both plane and perpendicular to the axis 4 as is the face 3 of the cavity 2, but they could equally well present a shape other than plane and/or be oriented obliquely relative to the axis 4.

Set back in the direction 131 from the face 22, the needle 21 presents a transverse annular shoulder 23 facing in the same direction as the face 22, which shoulder 23 presents a cone angle identical to that of the shoulder 20 against which it presses in a mutual sealing relationship when the needle is in the closed position, whereas it is set back from said shoulder 20 in the direction 131 when the needle is in the open position. Between the face 22 and the shoulder 23, the needle 21 is defined by an outer peripheral face that is not referenced, and that in the closed position matches an inner peripheral face, likewise not referenced, presented by the endpiece 18 between the shoulder 20 and the face 13 to define the passage 12 in the immediate vicinity of the outlet 19, thereby likewise establishing sealing between the closure needle 21 and the endpiece 18 in this location when in the closed position.

In a variant that is not shown, sealing between the closure needle 21 and the endpiece 18 in the closed position can be provided solely by mutual contact between the shoulders 20 and 23 or by mutual contact between the outer peripheral face of the closure needle 21 and the inner peripheral face of the endpiece 18 in the immediate vicinity of the outlet 19. Other arrangements could equally well be selected for this purpose without thereby going beyond the ambit of the present invention.

Set back in the direction 131 from the shoulder 23, the needle 21 presents a shape that is likewise known per se, suitable for leaving an empty cross-section around the needle inside the passage 12 that is large enough to enable the thermoplastic material in the fluid state to be delivered from the passage 11 through the outlet 19. Any suitable means can be provided in this location between the nozzle cylinder 17 and the closure needle 21 to ensure both that the needle remains coaxial relative to the passage 12 and that the needle 21 is guided in longitudinal sliding relative to the nozzle cylinder 17 between the closed and open positions of the outlet 19 in the endpiece 18.

Furthermore, longitudinally opposite from its front face 22, the closure needle 21 is guided to slide axially in the nozzle-mounting support 10 by a coaxial extender 24 into which it is screwed coaxially or with which it is secured by any other means, preferably releasably, in a zone of the passage 12 that is situated longitudinally opposite from the outlet 19, i.e. in the immediate vicinity of the angled passage 25 connecting the passage 12 to the passage 11 of the dispenser 8.

The extender 24 passes through the nozzle-mounting support 10 and presents outside the dispenser 8, opposite from the nozzle 7 along the axis 4 an end 26 into which there is screwed securely but releasably a bolt 27 for releasably securing a transverse washer 28 that is circularly symmetrical about the axis 4 serving to provide a connection for transmitting movement in longitudinal translation generated by a piston 29 of a double-acting hydraulic actuator 30. The actuator 30 also comprises a cylinder 31 releasably secured, e.g. by bolts, to a corresponding zone of the support plate 9 so that when its piston 29 is caused in move in longitudinal translation relative to its cylinder 31 that acts via the washer 28 either to pull on the end 26 along the axis 4 in the direction 131 so as to move the end 26 away from the face 13 of the endpiece 18, thereby moving the closure needle 21 into its position for opening the passage 12 to the cavity 2, or else to push the needle 21 in the opposite direction 130 so as to bring it into its position for closing the passage 12 in the endpiece 18.

In order to receive the cylinder 31 of the actuator 30 longitudinally opposite from the dispenser 8 and also to enable the extender 24 of the closure needle 21 to pass through under conditions suitable for enabling the end 26 of the extender 24 to co-operate via the washer 28 with the piston 29 of the actuator 30, said zone of the support plate 9 is pierced by a through hole 32 along the axis 4, said hole being defined facing the axis 4 by three inside peripheral faces 33, 34, and 35 which are circularly cylindrical about an axis that is assumed to coincide with the axis 4, having diameters of increasing size with the faces 33, 34, and 35 following one another in that order in the direction 131 and being interconnected in pairs by plane transverse annular shoulders 36, 37 facing in said direction 131. It can be seen that the axis of the hole 32 could nevertheless be offset transversely to a small extent relative to the axis 4 given the differences in thermal expansion that can arise between the support plate 9 and the dispenser 8 carrying the nozzle-mounting support 10 which acts in particular via a tubular sleeve-forming portion 38 described below to guide the extender 24 of the injection needle 21 in longitudinal sliding along the axis 4 and thus to define the position of said axis 4. While a thermoplastic material in the fluid state is being infected; the dispenser 8 is raised to a temperature that is higher than that of the support plate 9, which is much more exposed to ambient air and is consequently better cooled thereby.

By means of the hole 32 shaped in this way, the nozzle-mounting support 10 extends in the direction 131 inside said zone of the support plate 9 by means of the tubular sleeve-shaped portion 38 which is defined going away from the axis 4 by an outer peripheral face 39 that is circularly symmetrical about said axis and that has a diameter that is perceptibly smaller than the diameter of the inner peripheral face 33 of the hole 32 and also than the diameter of the unreferenced thread on the nozzle-mounted support 10 that receives the ring 16. In the direction 131, this face 39 is connected to a plane annular front face 40 that is circularly symmetrical about the axis 4 and that is perpendicular thereto, which face 40 faces in said direction 130 and is situated at an intermediate level of the inner peripheral face 35 of the hole 32.

Between this front face 40 and the angled passage 25, the nozzle-mounting support 10 including the sleeve-shaped portion 38 is defined towards the axis 4 by an inner peripheral face 41 that is circularly cylindrical about the axis 4. The extender 24 of the closure needle 21 is placed in guiding contact for longitudinal sliding relative to said face 41 via an outer peripheral face 42 which is likewise circularly cylindrical about the axis 4, having a diameter that is substantially identical to that of the face 41, and defining the extender 24 of the closure needle 21 going away from the axis 4, from the connection of said extender 24 with said needle 21 all the way to the end 26 of said extender 24. Longitudinally, the extender 24 is dimensioned in such a manner that both in the position of the closure needle 21 corresponding to the passage 12 being closed and in its position corresponding to said passage being opened, the end 26 of the extender 24 is continuously situated outside the sleeve-forming portion 38, i.e. it projects relative to the front face 40 in the direction 131 while the connection between the extender 24 and the needle 21 remains inside the passage 12 or the angled passage 25.

In order to seal the faces 41 and 42 relative to the thermoplastic material traveling in particular in the passages 12 and 25, the face 41 has at least one groove 43 formed therein suitable for receiving a sealing material, it being understood that the co-operation between the nozzle-mounting support 10 and the dispenser 8 also provides sealing relative to the thermoplastic material in the fluid state on either side of the passage 11.

In accordance with the present invention, this sealing material is constituted by the thermoplastic material itself, which leaks from the angled passage 25, penetrating between the faces 41 and 42 and migrating between them in the direction 131, coming to rest in the groove 43 and accumulating therein, given firstly the longitudinally-determined position thereof and secondly the fact that it is at a temperature that is lower than the injection temperature. The groove 43 is subjected to cooling by heat being conducted through the sleeve-forming portion 38 and along the extender 24 of the closure needle 21 in the direction 130, because the sleeve-forming portion 38 is exposed to ambient air via its face 39 and 40, and because the end 26 of the extender 24 and its portion adjacent thereto situated outside the sleeve-forming portion 38 is also exposed to ambient air, whereas the portion of the extender 24 situated inside the angled passage 25 and the portions of the nozzle-mounting support 10 defining said angled passage 25 are exposed to the injection temperature at which the thermoplastic material is maintained inside the dispensing passage 11 and the transit or injection passage 12, thus tending to heat the groove 43 by heat being conducted in the direction 131 along the nozzle-mounting support 10 and the extender 24 of the closure needle 21.

The size and the longitudinal position of the groove 43 within the sleeve-forming portion 38, relative to the angled passage 25 and the dispensing passage 11, i.e. the longitudinal distance d between the groove 43 and the passages 11 and 25, can readily be determined by the person skilled in the art using competences that are normal in the art, as a function in particular of the thermal conduction coefficient of the materials constituting the sleeve-forming portion 38, the nozzle-mounting support 10, and the extender 24 of the closure needle 21, on the basis of their respective shapes and sizes, on the basis of the range of injection temperatures that are liable to be used for the thermoplastic material, given the nature thereof, on the basis of the way in which the viscosity of said thermoplastic material varies, or on the basis of a determined range of thermoplastic materials as a function of temperature and as a function of a plausible range of temperatures for ambient air, such that the temperature to which the groove 43 is raised during the injection process by equilibrium being achieved between the above-specified opposing effects of cooling and heating by thermal conduction, which temperature is intermediate between the temperature of ambient air and the injection temperature, still remains higher than the limit temperature at which the thermoplastic material is in the fluid state but is nevertheless far enough below the injection temperature for the viscosity of the material reaching the groove 43 to present a value such that said thermoplastic material accumulates in the groove 43 and remains therein, forming an annular gasket providing mutual sealing between the faces 41 and 42.

By way of non-limiting example, good results have been obtained in testing by giving d a value that is about five times the diameter of the faces 41 and 42, with the longitudinal distance between the front face 40 and the passages 11 and 25 (i.e. the sum of d, plus the longitudinal size of the groove 43, plus the longitudinal distance between said groove and the front face 40) having a value of about six times the above-specified diameter. Naturally, other proportions could be selected without thereby going beyond the ambit of the present invention, in particular as a function of the ease or otherwise with which a flow of ambient air can be established around the sleeve-forming portion 38 and the portion of the extender 24 of the closure needle 21 that is adjacent to the end 26 of said extender.

In addition, in order to prevent the extender 24 of the closure needle 21 turning about the axis 4 relative to the nozzle-mounting support 10 or to the cylinder 17 and the endpiece 18 of the nozzle 7, the sleeve-forming portion 38 presents a rectilinear slot 45 opening out into the front face 40 and into the outer and inner peripheral faces 39 and 41 in a mean plane that contains the axis 4, and a projection 44 is received in said slot 45 with the ability to slide longitudinally but without the ability to turn about the axis 4, said projection 44 being integrally connected to the extender 24 of the closure needle 21 or being implemented in the form of a pin which is secured to said extender 24. The projection 44 extends perpendicularly to the axis 4 relative to the outer peripheral face 42 of the extender 24 over a distance that is no greater than the thickness of the sleeve-forming portion 38 as measured between its faces 39 and 41, perpendicularly to the axis 4. The respective longitudinal dimensions of the projection 44 and of the slot 45 are such as to avoid constituting an obstacle to displacement of the closure needle 21 together with its extender 24 between the opening and closed positions, while preventing turning about the axis 4 in each of these extreme positions, and at any point between them.

In conventional manner, the actuator 30 is disposed coaxially in the hole 32, i.e. it is at least approximately coaxial with the needle 21, and its piston 29 is connected to the washer 28 which is secured to the extender 24, itself secured to the injection needle 21 via a transmission member 46 which, while providing a connection without any slack along the axis 4, nevertheless allows for relative displacement to take place perpendicularly to said axis so as to allow the hole 32 and the actuator 30 to be slightly off-center relative to the nozzle 7, given the above-specified differences in thermal expansion between the support plate 9 carrying the cylinder 31 of the actuator 30 and the dispenser 8 carrying the nozzle-mounting support 10 which defines the position of the axis 4.

Nevertheless, to simplify the description, it is assumed below, as assumed above with reference to the hole 32, that the actuator 30 is coaxial with the nozzle 7, and more precisely is circularly symmetrical about the axis 4 as described with reference to the hole 32.

The actuator 30 is shown in such a position in FIG. 1 to which reference is made when describing the actuator, said description being restricted essentially to those characteristics of the actuator which correspond to a preferred embodiment of the present invention.

From the FIGURE it can be seen that the actuator 30 is an annular type actuator whose piston 29 and cylinder 31 are both circularly annular about the axis 4.

Respectively going away from said axis and along said axis, the cylinder 31 is defined by respective outer and end peripheral faces that are not referenced, enabling it to be engaged in a housing defined inside the hole 32 via its shoulders 36 and 37 and its inner peripheral face 34 and a portion of its inner peripheral face 35 directly adjacent to the shoulder 37, under conditions that are easily determined by the person skilled in the art so as to ensure that the actuator cylinder 31 is accurately positioned both longitudinally and transversely relative to the support plate 9, and so as to ensure that the cylinder 31 is set back longitudinally inside the hole 32 relative to a face 54, e.g. a plane face that is perpendicular to the axis 4 and defining the support plane 9 in the direction 131, i.e. longitudinally away from the dispenser 8, the nozzle 7, and the mold 1. In this face 54, a removable cover 55 protects the actuator 30 inside the hole 32.

Going towards the axis 4, the cylinder 31 presents two inner peripheral faces 66 and 68, both circularly cylindrical about the axis 4 which they face, having the same diameter smaller than the diameter of the inner peripheral face 33 of the hole 32.

The faces 66 and 68 are spaced apart longitudinally in such a manner that the cylinder 31 defines between them an annular cavity 74 that is circularly symmetrical about the axis 4, said cavity being sealed in both directions 130 and 131 and also going away from the axis 4.

The cylinder 31 uses the faces 66 and 68 to guide the piston 29 in axial sliding.

To this end, the piston 29 has a rod 69 defined going away from the axis 4 by an outer peripheral face 70 that is circularly cylindrical about the axis 4 with a diameter that is identical to the diameter of the faces 66 and 68 which are in sealing contact with the face 70, e.g. via appropriate sealing gaskets (not referenced) such that the rod 69 of the piston defines the annular cavity 74 of the cylinder 31 in leaktight manner towards the axis 4.

Inside said cavity 74, the rod 69 carries a transverse plate 75 that is circularly annular about the axis 4, projecting away from the axis 4 from the face 70 of the rod 69. Going away from the axis 4, the transverse plate 75 is defined by an outer peripheral face 76 that is circularly cylindrical about said axis having a diameter that is identical to the diameter of an inner peripheral face 58 of the cylinder 31, likewise circularly symmetrical about the axis 4 and defining the cavity 74 going away from the axis 4. The face 76 is in sliding contact with said face 58 and the plate 75 is sealed relative thereto, for example by means of an appropriate sealing gasket (not shown).

Longitudinally, the plate 75 is of a size that is smaller than that of the cavity 74 so that the plate 75 subdivides the cavity in leaktight manner into two sealed chambers 80 and 81 that are circularly cylindrical about the axis 4, with the respective volumes of the chambers 80 and 81 varying in opposite directions as the plate 75 slides in one direction or the other inside the cavity 74 relative to the cylinder 31, i.e. when the piston 29 moves longitudinally in one direction or the other relative to said body 31.

The chambers 80 and 81 are offset respectively in the direction 130 and in the direction 131 relative to the plate 75, and the difference between the respective longitudinal dimensions of the plate 75 and of the cavity 74 is equal to the longitudinal stroke that the closure needle 71 needs to travel between its closed position in which the plate 75 comes into abutment in the direction 130 against the cylinder 31 inside the cavity 74, with the volume of the chamber 80 then being at its minimum while the volume of the chamber 81 is at its maximum, and its open position in which the plate 75 comes into abutment in the opposite direction 131 against the cylinder 31 inside the cavity 74, with the volume of the chamber 81 then being at its minimum while the volume of the chamber 80 is at its maximum.

The face 70 of the rod 69 is itself dimensioned longitudinally on either side of the plate 75 so as to remain projecting to some extent in the direction 130 and in the direction 131 relative to the cylinder 31 in both of the limit positions as defined above for the piston 39 relative to the body 31.

In this respect, the longitudinal dimensions of those portions of the face 70 that are situated on respective sides of the plate 75 are measured respectively between the plate 75 and a plane transverse face 84 that is circularly annular about the axis 4 facing in the direction 130 and thus projecting in said direction 130 from the cylinder 31, and between the plate 75 and a plane transverse face 85 that is circularly annular about the axis 4 and perpendicular thereto, which face 85 thus faces in the direction 131 and projects longitudinally in the direction 131 from the cylinder 31.

In order to have an assembly that is compact, the rod 69 of the actuator in the example shown is tubular in shape and is defined towards the axis 4 by an inner peripheral face 86 that is circularly cylindrical about the axis 4 with a diameter that is greater than the diameter of the outer peripheral face 39 of the sleeve-forming portion 38 of the support 10 for mounting the nozzle 7 on the dispenser 8, and a priori than the outer peripheral face 42 of the extender 24 of the closure needle 21, thus making it possible to place the piston rod 69 around a fraction of the sleeve-forming portion 38, as shown in FIG. 1.

The inner peripheral face 86 thus extends the face 84 longitudinally to the immediate vicinity of the face 85 to which it is connected by tapping 87 whereby the rod 69 of the piston 29 receives securely but releasably the member 46 for transmitting movement.

To this end, the member 46 is generally in the form of a circular annulus about the axis 4, and in particular it presents a portion 88 in the form of a sleeve presenting, going away from the axis 4, a thread 89 complementary to the tapping 87 and engaged therein.

The sleeve-forming portion 88 thus placed inside the piston rod 69 is also defined going towards the axis 4 by an inner peripheral face 90 that is circularly cylindrical about said axis having a diameter that is smaller than the diameter of the inner peripheral face 86 but greater than the diameter of the outer peripheral face 42 of the extender 24 of the closure needle 21 such that there remains between the face 90 and the face 24, and also between the face 86 and the faces 24 and 39, annular clearance 132 that is continuous both circumferentially and longitudinally, enabling a limited amount of transverse movement to be accommodated between the actuator 30 carrying the member 46 and the extender 24 of the closure needle 21 together with the sleeve-forming portion 38 of the nozzle-mounting support 10.

This continuous tubular clearance 132 that is open to ambient air via the assembly clearances between the various components of the injector device, and possibly also via passages specially provided for this purpose, e.g. between the actuator cylinder 31 and the faces 34 to 37 of the hole 32 (in a manner that is not shown but that is easily designed by a person skilled in the art), also serves to bring this ambient air into contact with the faces 43 and 41 of the sleeve-forming portion 38 and with the face 42 of the extender 24 of the closure needle 21, in that portion of said face 42 that is situated projecting beyond the sleeve-forming portion 38, thus contributing to cooling said sleeve-forming portion 38 and the extender 24 in the groove 43, and consequently cooling the thermoplastic material that reaches said groove by migrating between the faces 41 and 42 from the angled passage 25, as desired in the context of the present invention.

Inside the piston rod 69, the outer peripheral thread 89 is connected to the inner peripheral face 90 via a plane transverse face 91 that is circularly annular about the axis 4 and perpendicular thereto, said face 91 facing in the direction 130 as does the face 84 relative to which it is set back slightly in the longitudinal direction inside the rod 69 so as to leave longitudinal spacing relative to the face 40 of the sleeve-forming portion 38 of the nozzle-mounting support 10, regardless of the position of the piston 29 relative to the actuator cylinder 31, within the limits determined by the plate 75 coming into abutment against the cylinder 31 inside the cavity 74 in the directions 130 and 131, so that longitudinal continuity of the clearance 132 is conserved regardless of the position of the piston.

Longitudinally away from its connection with the face 91, the outer peripheral thread 89 connects with a plane transverse shoulder 92 that is circularly annular about the axis 4 and that is perpendicular thereto, said shoulder 92 facing in the same direction as the face 91 and being placed longitudinally facing the face 85 of the piston rod 69. The shoulder 92 bears against said face 85 to limit screw-tightening and the extent to which the sleeve-forming portion 88 can be engaged longitudinally inside the piston rod 69.

At the shoulder 92, this sleeve-forming portion 88 is secured in the direction 131 to a portion 133 of the transmission member 46 lying outside the piston rod 29 and generally in the form of a circular annular ring about the axis 4, towards which axis the ring defines in conventional manner an annular groove 134 about said axis.

In a manner well known to the person skilled in the art and therefore not described, the washer 28 is received in said groove 134 without any longitudinal clearance, but with transverse clearance in all directions so that even though the piston 29 of the actuator 30 and the closure needle 21 can move relative to each other transversely in all directions, they nevertheless form a single unit for longitudinal movement in one direction or the other.

To drive such movement, a hydraulic fluid can be inserted at will into the chamber 80 or 81 in selective manner while exhausting any hydraulic fluid that might be found in the other chamber, with said chambers being connected for this purpose to a hydraulic fluid circuit (not shown) external to the actuator 30 via couplings such as 110 in a manner that is well known to the person skilled in the art and that is therefore not described.

The person skilled in the art will readily understand that the embodiment of the present invention described above constitutes merely a non-limiting example and numerous variants can be made thereto without going beyond the ambit of the invention. In particular, when there is no concern or constraint on longitudinal size that have lead to the piston rod of the actuator being implemented in tubular form, it is entirely possible to adopt the characteristic dispositions of the invention in association with an actuator having a solid rod, without that going outside the ambit of the present invention.

What is claimed is:

1. An apparatus comprising:
    an injector device for injecting a thermoplastic material into a mold cavity (2), the material being in the fluid state when raised to a temperature that is not less than a determined limit temperature higher than the temperature of ambient air, said injector device including:

a dispenser (8) suitable for being maintained at an injection temperature higher than said determined limit temperature and defining a thermoplastic material dispensing passage (11) having at least one outlet (25) for delivering thermoplastic material in a determined longitudinal direction (130) to one side of the dispenser;

an injection nozzle (7) which is suitable for being maintained at an injection temperature higher than said determined limit temperature and situated on said side of the dispenser (8), being secured thereto, and defining at least one longitudinal transit passage (12) for the thermoplastic material, said passage being placed in fluid-flow connection with the outlet (25) from the dispenser (8) in the direction (131) that is opposite to said direction (130) and opening out in said direction (130) in a front face (13) suitable for being integrated in the mold cavity (2);

at least one longitudinal closure needle (21) mounted to slide longitudinally inside the transit passage (12) between a position in which it closes it and a position in which it opens it, and presenting a longitudinal extender (24) extending in the direction (131) opposite to said direction (130), passing through the dispenser (8) into ambient air on the side of the dispenser (8) that is longitudinally opposite from said side thereof, via means (38) for guiding longitudinal sliding and presented securely by the dispenser (8) for this purpose, going longitudinally away from said outlet (25), the guide means (36) and the extender (24) of the needle (21) presenting respective inner and outer cylindrical longitudinal peripheral faces (41, 42) in mutual guiding contact for relative longitudinal sliding, with one of said peripheral faces (41) presenting an annular transverse groove for receiving a sealing gasket relative to the other one of said peripheral faces (42) in the closed and open positions of the closure needle (21), and also in all longitudinal positions between them; and controlled means (30) for causing the closure needle (21) to slide longitudinally between said closed and open positions, said controlled means being disposed in ambient air on the side of the dispenser (8) that is longitudinally opposite from said side thereof, and being functionally connected to the extender (24) of the closure needle (21) the device being characterized in that said groove (43) is offset longitudinally relative to the dispensing passage (11) in the direction (131) opposite to said direction (130) by a distance (d) that is determined in such a manner that under the effect of ambient air thermal conduction causes it to be placed at a temperature which is lower than the injection temperature but higher than said determined limit temperature when the dispenser (8) and the injection nozzle (7) are maintained at the injection temperature, and the thermoplastic material leaking in the fluid state between said inner and outer peripheral faces (41, 42) reaches said groove (42), fills said groove, and presents viscosity therein such as to remain stopped therein and itself constitute the sealing gasket.

2. An injector device according to claim 1, characterized in that said inner and outer peripheral faces (41, 42) and said groove (43) are circularly cylindrical about a common longitudinal axis (4).

3. An injector device according to claim 1 or claim 2, characterized in that said groove (43) is arranged in the inner peripheral face (41) of the guide means (38).

4. An injector device according to claim 1, characterized in that the guide means (38) comprise a longitudinal sleeve (38) which is placed on the side of the dispenser (8) that is longitudinally opposite from said side thereof and is secured to the dispenser (8) projecting from the dispenser (8) in the direction (131) opposite said direction (130), defining part of said inner peripheral face (41) and placed in contact with ambient air, in particular transversely opposite from said inner peripheral face (41).

5. An injector device according to claim 4, characterized in that said groove (43) is arranged in the portion of said inner peripheral face (41) which is defined by the sleeve (38).

6. An injector device according to claim 4, characterized in that the controlled means (30) for causing the closure needle (21) to slide longitudinally between its closed and open positions comprise a longitudinal annular actuator (30) placed around the sleeve (38), leaving continuous annular clearance (132) relative thereto and comprising firstly a cylinder (31) secured to the dispenser (8) and secondly a piston (29) longitudinally secured to the extender (24) of the closure needle (21).

* * * * *